No. 891,841. PATENTED JUNE 30, 1908.
K. KOHLMANN & G. ANDREE.
AUTOMOBILE WHEEL.
APPLICATION FILED JAN. 22, 1906.

UNITED STATES PATENT OFFICE.

KARL KOHLMANN AND GUSTAV ANDREE, OF DANE, WISCONSIN.

AUTOMOBILE-WHEEL.

No. 891,841.  Specification of Letters Patent.  Patented June 30, 1908.

Application filed January 22, 1906. Serial No. 297,366.

*To all whom it may concern:*

Be it known that we, KARL KOHLMANN and GUSTAV ANDREE, citizens of the United States, residing at Dane, in the county of Dane and State of Wisconsin, have invented certain new and useful Improvements in Automobile-Wheels, of which the following is a specification.

Our invention relates to improvements in the construction of wheels for vehicles and especially automobile wheels, and the improvements consist in making an interlocking wheel-rim and tire whereby the latter is held securely on the rim against lateral displacement and longitudinal creeping, and at the same time the tire may be quickly and easily removed and replaced.

In the accompanying drawing we have shown a preferred adaptation of our invention in the following views:—

Figure 1:
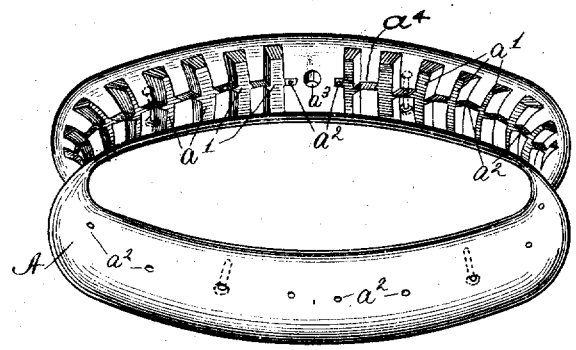
Figure 2:
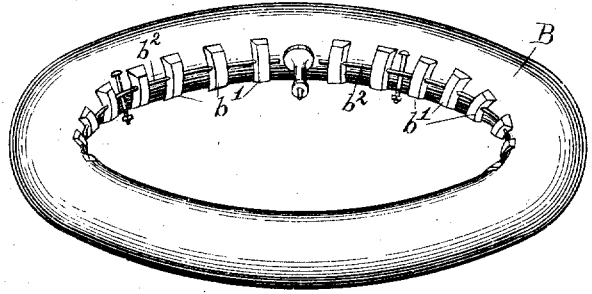
Figure 3:
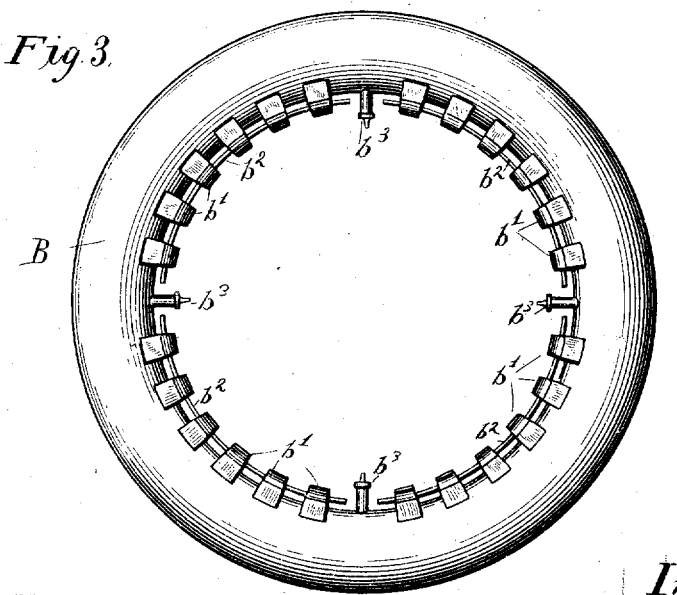

Figure 1 is a perspective view of the rim of our improved wheel; Fig. 2 is a perspective view of the tire of our improved wheel, and Fig. 3 is a plan view of the tire.

Referring to the details of the drawing, A represents a concave convex wheel rim made of any suitable material. In the concave face of the rim are cut a plurality of transverse rectangular recesses $a^1$ which are spaced apart and formed around the entire rim at such intervals as in practice may be found to give the most satisfactory results. These recesses are connected with each other by slots $a^4$ which are cut through the ribs between the recesses, as shown in Fig. 1. At intervals, holes $a^2$ are bored transversely in the ribs, to receive retaining bolts as indicated by dotted lines in Fig. 1. One or more valve openings $a^3$ are formed through the rim.

B represents the tire which in its general construction may be of any approved form or material. Our improvements consist in forming on the face of the tire, which rests upon the rim, a plurality of lugs $b^1$ which are adapted to fit snugly in the recesses $a^1$ when the tire is in place. The lugs have holes formed therethrough in which retaining wires $b^2$ are strung. Instead of several short wires $b^2$, a single wire may be inserted through the lugs $b^1$ and extend around the inner periphery of the tire.

When the tire is set in the rim, retaining bolts are inserted through the holes $a^2$ in the rim and pass over the wires $b^2$ thus securing the latter against outward movement and thereby preventing the displacement or throwing of the tire when in use. If it be desired to remove a tire, it is only necessary to remove the retaining bolts, when the tire can be easily forced over the edge of the rim or felly. Inasmuch as our improvements provide for holding the tire against slippage in every direction, clencher rims are not required with our invention.

While we have shown many lugs and recesses, it will be apparent these may be reduced in number and size where the strain on the tire is normal, but in wheels used on racing machines, a relatively greater number of the interlocking lugs and recesses are needed.

Having thus described our invention what we claim is:—

1. In a wheel, a rim having a plurality of rectangular transverse recesses formed therein, a tire having a plurality of rectangular transverse lugs formed on its inner periphery, said lugs adapted to fit snugly said recesses, a retaining wire passing through said lugs, and means detachably connecting said wire with said rim.

2. In a wheel, a rim having a plurality of transverse recesses formed therein and with slots connecting said recesses, a tire having a plurality of lugs formed thereon and adapted to fit said recesses, a retaining band passing through said lugs and arranged in said slots and means detachably connecting said band with said rim.

In testimony whereof we affix our signatures in presence of two witnesses.

KARL KOHLMANN
GUSTAV ANDREE.

Witnesses:
ALBERT KOHLMANN,
M. O'DWYER.